(12) United States Patent
Van Dyke Parunak et al.

(10) Patent No.: US 7,921,066 B2
(45) Date of Patent: Apr. 5, 2011

(54) CHARACTERIZING AND PREDICTING AGENTS VIA MULTI-AGENT EVOLUTION

(76) Inventors: Henry Van Dyke Parunak, Ann Arbor, MI (US); Sven Brueckner, Dexter, MI (US); Robert S. Matthews, Saline, MI (US); John A. Sauter, Ann Arbor, MI (US); Steven M. Brophy, Saline, MI (US); Robert J. Bisson, Dexter, MI (US)

( * ) Notice: Subject to any disclaimer, the term of this patent is extended or adjusted under 35 U.S.C. 154(b) by 547 days.

(21) Appl. No.: 11/548,909

(22) Filed: Oct. 12, 2006

(65) Prior Publication Data

US 2007/0162405 A1    Jul. 12, 2007

Related U.S. Application Data

(60) Provisional application No. 60/725,854, filed on Oct. 12, 2005.

(51) Int. Cl.
*G06F 3/00* (2006.01)
*G06N 3/12* (2006.01)
(52) U.S. Cl. .............................. 706/13; 716/105; 700/56
(58) Field of Classification Search ........................ None
See application file for complete search history.

(56) References Cited

U.S. PATENT DOCUMENTS

| | | | |
|---|---|---|---|
| 7,284,228 B1 * | 10/2007 | Haratsaris | 716/16 |
| 2005/0240412 A1 * | 10/2005 | Fujita | 704/270 |
| 2006/0059113 A1 * | 3/2006 | Kuznar et al. | 706/45 |

OTHER PUBLICATIONS

International Conference on Autonomous Agents, 2002, Digital Pheromone Mechanisms for Coordination of Unmanned Vehicles, Parunak, Brueckneramd Sauter.*

S. Brueckner. Return from the Ant: Synthetic Ecosystems for Manufacturing Control. Dr.rer.nat. Thesis at Humboldt University Berlin, Department of Computer Science, 2000. Available at http://dochost.rz.hu-berlin.de/dissertationen/brueckner-sven-2000-06-21/PDF/Brueckner.pdf.

S. Carberry. "Techniques for Plan Recognition." User Modeling and User-Adapted Interaction, 11(1-2):31-48, 2001. Available at http://www.cis.udel.edu/~carberry/Papers/UMUAI-PlanRec.ps.

(Continued)

*Primary Examiner* — Donald Sparks
*Assistant Examiner* — Kalpana Bharadwaj
(74) *Attorney, Agent, or Firm* — Wayne Edward Ramage; Baker Donelson

(57) ABSTRACT

A method of predicting the behavior of software agents in a simulated environment involves modeling a plurality of software agents representing entities to be analyzed, which may be human beings. Using a set of parameters that governs the behavior of the agents, the internal state of at least one of the agents is estimated by its behavior in the simulation, including its movement within the environment. This facilitates a prediction of the likely future behavior of the agent based solely upon its internal state; that is, without recourse to any intentional agent communications. In the preferred embodiment the simulated environment is based upon a digital pheromone infrastructure. The simulation integrates knowledge of threat regions, a cognitive analysis of the agent's beliefs, desires, and intentions, a model of the agent's emotional disposition and state, and the dynamics of interactions with the environment. By evolving agents in this rich environment, we can fit their internal state to their observed behavior. In realistic wargame scenarios, the system successfully detects deliberately played emotions and makes reasonable predictions about the entities' future behavior.

19 Claims, 4 Drawing Sheets

OTHER PUBLICATIONS

J. Ferber and J.-P. Müller. "Influences and Reactions: a Model of Situated Multiagent Systems." In Proceedings of Second International Conference on Multi-Agent Systems (ICMAS-96), pp. 72-79, 1996.

A. Haddadi and K. Sundermeyer. "Belief-Desire-Intention Agent Architectures." In G. M. P. O'Hare and N. R. Jennings, Editors, Foundations of Distributed Artificial Intelligence, pp. 169-185. John Wiley, New York, NY, 1996.

M. K. Lauren and R. T. Stephen. "Map-Aware Non-uniform Automata (MANA)-A New Zealand Approach to Scenario Modelling." Journal of Battlefield Technology, 5(Mar. 1)):27ff, 2002. Available at http://www.argospress.com/jbt/Volume5/5-1-4.htm.

F. Michel. Formalisme, méthodologie et outils pour la modélisation et la simulation de systèmes multi-agents. Doctorat Thesis at Université des Sciences et Techniques du Languedoc, Department of Informatique, 2004. Available at http://www.lirmm.fr/~fmichel/these/index.html.

H. V. D. Parunak, R. Bisson, S. Brueckner, R. Matthews, and J. Sauter. "Representing Dispositions and Emotions in Simulated Combat." In Proceedings of Workshop on Defense Applications of Multi-Agent Systems (DAMAS05, at AAMAS05), pages (forthcoming), 2005. Available at http://www.altarum.net/~vparunak/DAMASO5DETT.pdf.

H. V. D. Parunak and S. Brueckner. "Ant-Like Missionaries and Cannibals: Synthetic Pheromones for Distributed Motion Control." In Proceedings of Fourth International Conference on Autonomous Agents (Agents 2000), pp. 467-474, 2000. Available at http://www.altarum.net/~vparunak/MissCann.pdf.

H.V. D. Parunak, S. Brueckner, and J. Sauter. "Digital Pheromones for Corrdination of Unmanned Vehicles." In Proceedings of Workshop on Environments for Multi-Agent Systems (E4MAS 2004), pp. 246-263, Springer, 2004. Available at http://www.altarum.net/~vparunak/E4MAS04_UAVCoordination.pdf.

A. S. Rao and M. P. Georgeff. "Modeling Rational Agents within a BDI Architecture." In Proceedings of International Conference on Principles of Knowledge Representation and Reasoning (KR-91), pp. 473-484, Morgan Kaufman, 1991.

J. A. Sauter, R. Matthews, H. V. D. Parunak, and S. Brueckner. "Evolving Adaptive Pheromone Path Planning Mechanisms." In Proceedings of Autonomous Agents and Multi-Agent Systems (AAMAS02), pp. 434-440, 2002. Available at www.altarum.net/~vparunak/AAMAS02Evolution.pdf.

A. Ilachinski. "Chapter 4: EINSTein: Mathematical Overview." In Artificial War: Multiagent-based Simulation of Combat. Singapore, World Scientific, 2004.

J. Liu and K.P. Sycara. "Multiagent Coordination in Tightly Coupled Task Scheduling." ICMAS-96, pp. 181-188.

H. Van Dyke Parunak, S. Brueckner, J. Sauter; "Synthetic Pheromone Mechanisms for Coordination of Unamnned Vehicles," AAMAS '02, Jul. 2002.

H. Van Dyke Parunak, S. Brueckner, M. Fleischer, J. Odell; "Co-X: Defining what Agents do Together," AAMAS '02, Jul. 2002.

P. Kanade, L. Hall; "Fuzzy Ants as a Clustering Concept," 22nd International Conference of the North American Fuzzy Information Processing Society, pp. 227-232 (date unknown).

\* cited by examiner

CHARACTERIZING AND PREDICTING AGENTS VIA MULTI-AGENT EVOLUTION

REFERENCE TO RELATED APPLICATION

This application claims priority from U.S. Provisional Patent Application Ser. No. 60/725,854, filed Oct. 12, 2005, the entire content of which is incorporated herein by reference.

GOVERNMENT SPONSORSHIP

This application is based in part upon work supported by the Defense Advanced Research Projects Agency (DARPA) under Contract No. NBCHC040153. Any opinions, findings and conclusions or recommendations expressed in this material are those of the inventors(s) and do not necessarily reflect the views of the DARPA or the Department of Interior-National Business Center DOI-NBC). Distribution Statement "A" (Approved for Public Release, Distribution Unlimited).

FIELD OF THE INVENTION

This invention relates generally to agent behavior and, in particular, to a system and method that characterizes an agent's internal state by evolution against observed behavior, and predicts future behavior, taking into account the dynamics of agent interaction with their environment.

BACKGROUND OF THE INVENTION

Reasoning about agents that we observe in the world must integrate two disparate levels. Our observations are often limited to the agent's external behavior, which can frequently be summarized: numerically as a trajectory in space-time (perhaps punctuated by actions from a fairly limited vocabulary). However, this behavior is driven by the agent's internal state, which (in the case of a human) may involve high-level psychological and cognitive concepts such as intentions and emotions. A central challenge in many application domains is reasoning from external observations of agent behavior to an estimate of their internal state. Such reasoning is motivated by a desire to predict the agent's behavior. Work to date focuses almost entirely on recognizing the rational state (as opposed to the emotional state) of a single agent (as opposed to an interacting community), and frequently takes advantage of explicit communications between agents (as in managing conversational protocols).

It is increasingly common in agent theory to describe the cognitive state of an agent in terms of its beliefs, desires, and intentions (the so-called "BDI" model [4, 15]). An agent's beliefs are propositions about the state of the world that it considers true, based on its perceptions. Its desires are propositions about the world that it would like to be true. Desires are not necessarily consistent with one another: an agent might desire both to be rich and not to work at the same time. An agent's intentions, or goals, are a subset of its desires that it has selected, based on its beliefs, to guide its future actions. Unlike desires, goals must be consistent with one another (or at least believed to be consistent by the agent).

An agent's goals guide its actions. Thus one ought to be able to learn something about an agent's goals by observing its past actions, and knowledge of the agent's goals in turn enables conclusions about what the agent may do in the future.

There is a considerable body of work in the AI and multi-agent community on reasoning from an agent's actions to the goals that motivate them. This process is known as "plan recognition" or "plan inference." A recent survey is available at [2]. This body of work is rich and varied. It covers both single-agent and multi-agent (e.g., robot soccer team) plans, intentional vs. non-intentional actions, speech vs. non-speech behavior, adversarial vs. cooperative intent, complete vs. incomplete world knowledge, and correct vs. faulty plans, among other dimensions.

Plan recognition is seldom pursued for its own sake. It usually supports a higher-level function. For example, in human-computer interfaces, recognizing a user's plan can enable the system to provide more appropriate information and options for user action. In a tutoring system, inferring the student's plan is a first step to identifying buggy plans and providing appropriate remediation. In many cases, the higher-level function is predicting likely future actions by the entity whose plan is being inferred.

Many realistic problems deviate from these conditions:
  Increasing the number of agents leads to a combinatorial explosion of possibilities that can swamp conventional analysis.
  The dynamics of the environment can frustrate the intentions of an agent.
  The agents often are trying to hide their intentions (and even their presence), rather than intentionally sharing information.
  An agent's emotional state may be at least as important as its rational state in determining its behavior.

Domains that exhibit these constraints can often be characterized as adversarial, and include military combat, competitive business tactics, and multi-player computer games.

SUMMARY OF THE INVENTION

This invention resides in a method of predicting the behavior of software agents in a simulated environment. The method involves modeling a plurality of software agents representing entities to be analyzed, which may be human beings. Using a set of parameters that governs the behavior of the agents, the internal state of at least one of the agents is estimated by its behavior in the simulation, including its movement within the environment. This facilitates a prediction of the likely future behavior of the agent based solely upon its internal state; that is, without recourse to any intentional agent communications.

In the preferred embodiment the simulated environment is based upon a digital pheromone infrastructure. The digital pheromones are scalar variables that agents can sense and which they deposit at their current location in the environment. The agents respond to the local concentrations of the digital pheromones tropistically through climbing or descending local gradients. The pheromone infrastructure runs on the nodes of a graph-structured environment, preferably a rectangular lattice. Each agent is capable of aggregating pheromone deposits from individual agents, thereby fusing information across multiple agents over time. Each agent is further capable of evaporating pheromones over time to remove inconsistencies that result from changes in the simulation, and diffusing pheromones to nearby places, thereby disseminating information for access by nearby agents.

By reasoning from an entity's observed behavior, this invention is capable of providing an estimate of the entity's internal state, and extrapolate that estimate into a prediction of the entity's likely future behavior. The system and method, called BEE (Behavioral Evolution and Extrapolation) performs these and other tasks using a faster-than-real-time simulation of lightweight swarming agents, coordinated through digital pheromones. This simulation integrates knowledge of threat regions, a cognitive analysis of the agent's beliefs, desires, and intentions, a model of the agent's emotional disposition and state, and the dynamics of interactions with the environment. By evolving agents in this rich environment, we can fit their internal state to their observed behavior. In realistic wargame scenarios, the system successfully detects deliberately played emotions and makes reasonable predictions about the entities' future behavior.

DETAILED DESCRIPTION OF THE INVENTION

BEE (Behavioral Evolution and Extrapolation) is a novel approach to addressing the recognition of the rational and emotional state of multiple interacting agents based solely on their behavior, without recourse to intentional communications from them. It is inspired by techniques used to predict the behavior of nonlinear dynamical systems, in which a representation of the system is continually fit to its recent past behavior. In such analysis of nonlinear dynamical systems, the representation takes the form of a closed form mathematical equation. In BEE, it takes the form of a set of parameters governing the behavior of software agents representing the individuals being analyzed.

In contrast to previous research in AI (plan recognition) and nonlinear dynamics systems (trajectory prediction), this invention focuses on plan recognition iii support of prediction. An agent's plan is a necessary input to a prediction of its future behavior, but hardly a sufficient one. At least two other influences, one internal and one external, need to be taken into account.

The external influence is the dynamics of the environment, which may include other agents. The dynamics of the real world impose significant constraints.

The environment is autonomous (it may do things on its own that interfere with the desires of the agent) [3, 8]:

Most interactions among agents, and between agents and the world, are nonlinear. When iterated, these can generate rapid divergence of trajectories ("chaos," sensitivity to initial conditions)

A rational analysis of an agent's goals may enable us to predict what it will attempt, but any nontrivial plan with several steps will depend sensitively at each step to the reaction of the environment, and our prediction must tale this into account as well. Actual simulation of futures is one way (the only one we know now) to deal with these.

In the case of human agents, an internal influence also comes into play. The agent's emotional state can modulate its decision process and its focus of attention (and thus its perception of the environment). In extreme cases, emotion can lead an agent to choose actions that from the standpoint of a logical analysis may appear irrational.

Current work on plan recognition for prediction focuses on the rational plan, and does not take into account either external environmental influences or internal emotional biases. BEE integrates all three elements into its predictions.

Real-Time Fitting in Nonlinear Systems Analysis

Many systems of interest can be described in terms of a vector of real numbers that changes as a function of time. The dimensions of the vector define the system's state space. Notionally, one typically analyzes such systems as vector differential equations, e.g., $$\frac{d\bar{x}}{dt} = f(\bar{x}).$$

Figure 1:
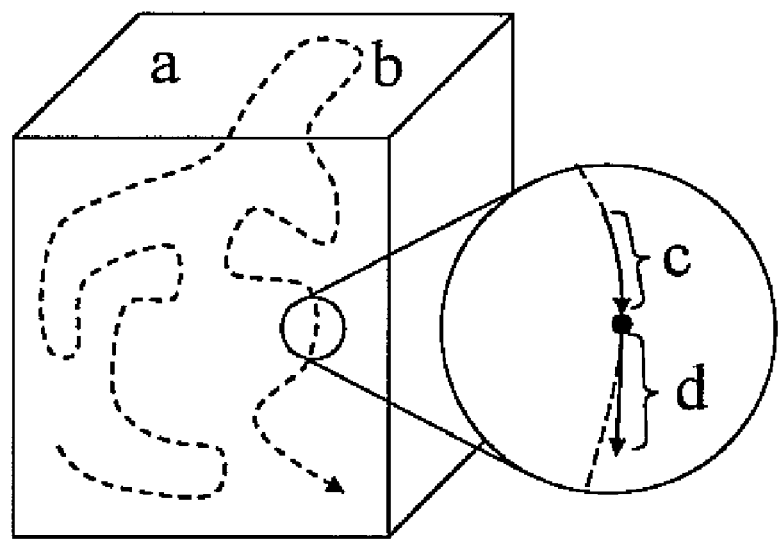
FIG. 1 is a tracking a nonlinear dynamical system wherein a=system state space; b=system trajectory over time; c=recent measurements of system state; and d=short-range prediction.

When $f$ is nonlinear, the system can be formally chaotic, and starting points arbitrarily close to one another can lead to trajectories that diverge exponentially rapidly, becoming uncorrelated. Long-range prediction of the behavior of such a system is impossible in principle. However, it is often useful to anticipate the system's behavior a short distance into the future. To do so, a common technique is to fit a convenient functional form for $f$ to the system's trajectory in the recent past, and then extrapolate this fit into the future FIG. 1, [6]). This process is repeated constantly, in real time, providing the user with a limited look-ahead into the system's future.

While this approach is robust and widely applied, it requires systems that can efficiently be described in terms of mathematical equations that can be fit using optimization methods such as least squares. BEE takes its inspiration from this approach, but applies it to agent behaviors, which it fits to observed behavior using a genetic algorithm.

Architecture

BEE predicts the future by observing the emergent behavior of agents representing the entities of interest in a fine-grained agent simulation. Key elements of the BEE architecture include the model of an individual agent, the pheromone infrastructure through which agents interact, the information sources that guide them, and the overall evolutionary cycle that they execute.

Agent Model

The agents in BEE are inspired by two bodies of work. The first is our own previous work on fine-grained agents that coordinate their actions stigmergically, through digital pheromones in a shared environment [1, 11, 13, 14, 16]. The second inspiration is the success of previous agent-based combat modeling in EINSTein and MAUI.

Digital pheromones are scalar variables that agents deposit at their current location in the environment, and that they can sense. Agents respond to the local concentrations of these variables tropistically, typically climbing or descending local gradients. Their movements in turn change the deposit patterns. This feedback loop, together with processes of evaporation and propagation in the environment, can support complex patterns of interaction and coordination among the agents [12]. Table 1 shows the pheromone flavors currently used in the BEE. In addition, ghosts take into account their distance from distinguished static locations, a mechanism that we call "virtual pheromones," since it has the same effect as propagating a pheromone field from such a location, but with lower computational costs.

TABLE 1

PHEROMONE FLAVORS IN RAID

| | |
|---|---|
| RedAlive | Emitted by a living or dead |
| RedCasualty | entity of the appropriate group |
| BlueAlive | (Red = enemy, Blue = friendly, Green = neutral) |
| BlueCasualty | |
| GreenAlive | |
| GreenCasualty | |
| WeaponsFire | Emitted by a firing weapon |
| KeySite | Emitted by a site of particular importance to Red |
| Cover | Emitted by locations that afford cover from fire |
| Mobility | Emitted by roads and other structures that enhance agent mobility |
| RedThreat | Determined by external process |
| BlueThreat | |

Our use of agents to model combat is inspired by EINSTein and MAUI. EINSTein [5] represents an agent as a set of six weights, each in [−1, 1], describing the agent's response to six kinds of information. Four of these describe the number of alive friendly, alive enemy, injured friendly, and injured enemy troops within the agent's sensor range. The other two weights relate to the model's use of a childhood game, "capture the flag," as a prototype of combat. Each team has a flag, and seeks to protect it from the other team while capturing the other team's flag. The fifth and sixth weights describe how far the agent is from its own and its adversary's flag. A positive weight indicates that the agent is attracted to the entity described by the weight, while a negative weight indicates that it is repelled.

MANA [7] extends the concepts in EINSTein. Friendly and enemy flags are replaced by the waypoints being pursued by each side. MANA includes four additional components: low, medium, and high threat enemies. In addition, it defines a set of triggers (e.g., reaching a waypoint, being shot at, making contact with the enemy, being injured) that shift the agent from one personality vector to another. A default state defines the personality vector when no trigger state is active.

The personality vectors in MANA and EINSTein reflect both rational and emotive aspects of decision-making. The notion of being attracted or repelled by friendly or adversarial forces in various states of health is an important component of what we informally think of as emotion (e.g., fear, compassion, aggression), and the use of the term "personality" in both EINSTein and MANA suggests that the system designers are thinking anthropomorphically, though they do not use "emotion" to describe the effect they are trying to achieve. The notion of waypoints to which an agent is attracted reflects goal-oriented rationality.

BEE embodies an integrated rational-emotive personality model.

A BEE agent's rationality is modeled as a vector of seven desires, which are values in [−1, +1]: ProtectRed (the adversary), ProtectBlue (friendly forces), ProtectGreen (civilians), ProtectKeySites, AvoidCombat, AvoidDetection, and Survive. Negative values reverse the sense suggested by the label. For example, a negative value of ProtectRed indicates a desire to harm Red.

Table 2 shows which pheromones A(ttract) or R(epel) an agent with a given desire, and how that tendency translates into action.

The emotive component of a BEE's personality is based on the Ortony-Clore-Collins (OCC) framework [9], and described in detail elsewhere [10]. OCC define emotions as "valanced reactions to agents, states, or events in the environment." This notion of reaction is captured in MANA's trigger states. An important advance in BEE's emotional model with respect to MANA and EINSTein is the recognition that agents may differ in how sensitive they are to triggers. For example, threatening situations tend to stimulate the emotion of fear, but a given level of threat will produce more fear in a new recruit than in a seasoned combat veteran. Thus our model includes not only Emotions, but Dispositions. Each Emotion has a corresponding Disposition. Dispositions are relatively stable, and considered constant over the time horizon of a run of the BEE, while Emotions vary based on the agent's disposition and the stimuli to which it is exposed.

Based on interviews with military domain experts we identified the two most crucial emotions for combat behavior as Anger (with the corresponding disposition Irritability) and Fear (whose disposition is Cowardice). Table 3 shows which pheromones trigger which emotions. Emotions are modeled as agent hormones (internal pheromones) that are augmented in the presence of the triggering environmental condition and evaporate over time.

TABLE 3

INTERACTIONS OF PHEROMONES AND DISPOSITIONS/EMOTIONS

| | Red Perspective | | Blue Perspective | | Green Perspective | |
|---|---|---|---|---|---|---|
| | Irritability/ Anger | Cowardice/ Fear | Irritability/ Anger | Cowardice/ Fear | Irritability/ Anger | Cowardice/ Fear |
| Pheromone | | | | | | |
| RedAlive | | | X | X | | |
| RedCasualty | X | X | | | | |
| BlueAlive | X | X | | | X | X |
| BlueCasualty | | | X | X | | |

TABLE 3-continued

INTERACTIONS OF PHEROMONES AND DISPOSITIONS/EMOTIONS

| | Red Perspective | | Blue Perspective | | Green Perspective | |
| --- | --- | --- | --- | --- | --- | --- |
| | Irritability/ Anger | Cowardice/ Fear | Irritability/ Anger | Cowardice/ Fear | Irritability/ Anger | Cowardice/ Fear |
| GreenCasualty | X | X | | | X | X |
| WeaponsFire | X | X | X | X | X | X |
| KeySites | X | | | | X | |

The effect of a non-zero emotion is to modify actions. An elevated level of Anger will increase movement likelihood, weapon firing likelihood, and tendency toward an exposed posture. An increasing level of Fear will decrease these likelihoods.

Figure 2:
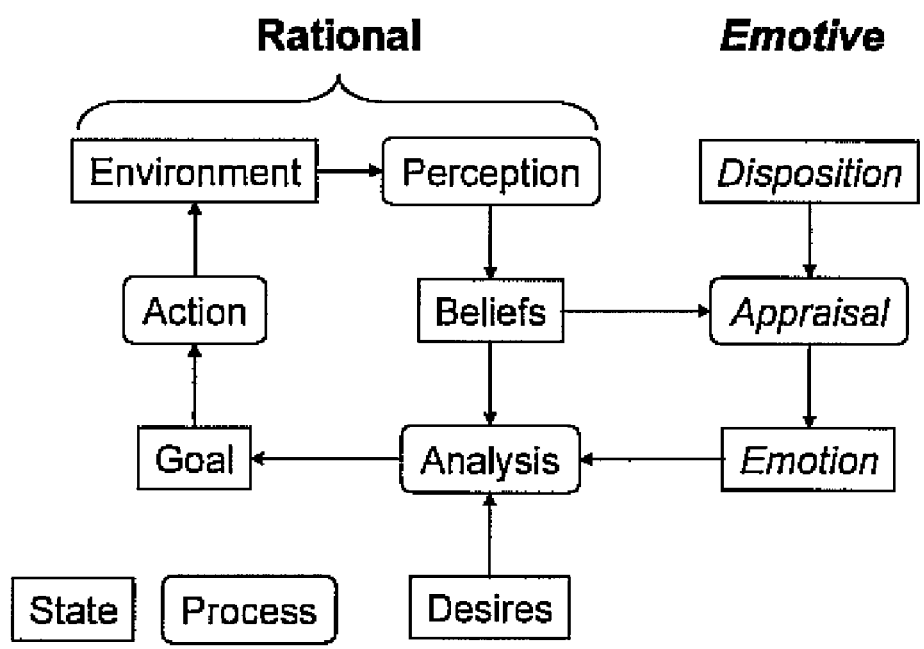
FIG. 2 is a BEE's Integrated Rational and Emotive Personality Model.

FIG. 2 summarizes the BEE's personality model. The left two columns are a straightforward BDI model (where we prefer the term "goal" to "intention"). The right-hand column is the emotive component, where an appraisal of the agent's beliefs, moderated by the disposition, leads to an emotion that in turn influences the BDI analysis.

The BEE Cycle

A major innovation in BEE is an extension of the nonlinear systems technique described in Section 2.2 to characterize agents based on their past behavior and extrapolate their future behavior based on this characterization. This section describes this process at a high level, then discusses in more detail the multi-page pheromone infrastructure that implements it.

Overview

Figure 3:
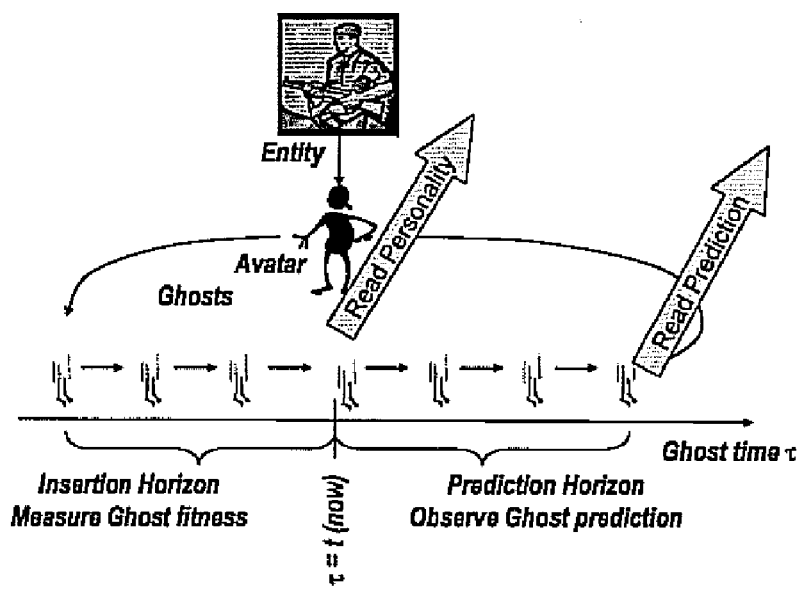
FIG. 3 is a Behavioral Emulation and Extrapolation, wherein each avatar generates a stream of ghosts that sample the personality space of the entity it represents. They evolve against the observed behavior of the entity in the recent past, and the fittest ghosts then run into the future to generate predictions.

FIG. 3 is an overview of the Behavior Evolution and Extrapolation process. Each active entity in the battlespace has an avatar that continuously generates a stream of ghost agents representing itself.

Ghosts live on a timeline indexed by $\tau$ that begins in the past at the insertion horizon and runs into the future to the prediction horizon. $\tau$ is offset with respect to the current time t in the domain being modeled. The timeline is divided into discrete "pages," each representing a successive value of $\tau$. The avatar inserts the ghosts at the insertion horizon. In our current system, the insertion horizon is at $\tau-t=-30$, meaning that ghosts are inserted into a page representing the state of the world 30 minutes ago. At the insertion horizon, each ghost's behavioral parameters (desires and dispositions) are sampled from distributions to explore alternative personalities of the entity it represents.

Each page between the insertion horizon and $\tau=t$ ("now," the pace corresponding to the state of the world at the current domain time) records the historical state of the world at the point in the past to which it corresponds. As ghosts move from page to page, they interact with this past state, based on their behavioral parameters. These interactions mean that their fitness depends not just on their own actions, but also on the behaviors of the rest of the population, which is also evolving. Because $\tau$ advances faster than real time, eventually $\tau=t$ (actual time). At this point, each ghost is evaluated based on its location compared with the actual location of its corresponding real-world entity.

The fittest ghosts have three functions.

1. The personality of the fittest ghost for each entity is reported to the rest of the system as the likely personality of the corresponding entity. This information enables us to characterize individual warriors as unusually cowardly or brave.

2. The fittest ghosts are bred genetically and their offspring are reintroduced at the insertion horizon to continue the fitting process.

3. The fittest ghosts for each entity form the basis for a population of ghosts that are allowed to run past the avatar's present into the future. Each ghost that is allowed to run into the future explores a different possible future of the battle, analogous to how some people plan ahead by mentally simulating different ways that a situation might unfold. Analysis of the behaviors of these different possible futures yields predictions.

A review of this process shows that BEE has three distinct notions of time, all of which may be distinct from real-world time.

1. Domain time t is the current time in the domain being modeled. This time may be the same as real-world time, if BEE is being applied to a real-world situation. In our current experiments, we apply BEE to a battle taking place in a simulator, the OneSAF Test Bed (OTB), and domain time is the time stamp published by OTB. During actual runs, OTB is often paused, so domain time runs slower than real time. When we replay logs from simulation runs, we can speed them up so that domain time runs faster than real time.

2. BEE time $\tau$ for a specific page records the domain time corresponding to the state of the world represented on that page, and is offset from the current domain time.

3. Shift time is incremented every time the ghosts move from one page to the next. The relation between shift time and real time depends on the processing resources available.

Pheromone Infrastructure

BEE must operate very rapidly in order to keep pace with an ongoing evolution of a battle or other complex situation. Thus we use simple agents coordinated using pheromone mechanisms. We have described the basic dynamics of our pheromone infrastructure elsewhere [1]. This infrastructure runs on the nodes of a graph-structured environment (in the case of BEE, a rectangular lattice). Each node maintains a scalar value for each flavor of pheromone, and provides three functions:

It aggregates deposits from individual agents, fusing information across multiple agents and through time.

It evaporates pheromones over time. This dynamic is an innovative alternative to traditional truth maintenance in artificial intelligence. Traditionally, knowledge bases remember everything they are told unless they have a reason to forget something, and expend large amounts of computation in the NP-complete problem of reviewing their holdings to detect inconsistencies that result from changes in the domain being modeled. Ants immediately begin to forget everything they learn, unless it is continually reinforced. Thus inconsistencies automatically remove themselves within a known period.

It diffuses pheromones to nearby places, disseminating information for access by nearby agents.

The distribution of each pheromone flavor over the environment forms a scalar field that represents some aspect of the state of the world at an instant in time. Each page of the timeline discussed in the previous section is a complete pheromone field for the world at the BEE time $\tau$ represented by that page. The behavior of the pheromones on each page depends on whether the page represents the past or the future.

In pages representing the future ($\tau > t$), the usual pheromone mechanisms apply. Ghosts deposit pheromone each time they move to a new page, and pheromones evaporate and propagate from one page to the next.

In pages representing the domain past ($\tau \leq t$), we have an observed state of the real world. This has two consequences for pheromone management. First, we can generate the pheromone fields directly from the observed locations of individual entities, so there is no need for the ghosts to make deposits. Second, we can adjust the pheromone intensities based on the changed locations of entities from page to page, so we do not need to evaporate or propagate the pheromones. Both of these simplifications reflect the fact that in our current system, we have complete knowledge of the past. When we introduce noise and uncertainty, we will probably need to introduce dynamic pheromones in the past as well as the future.

Execution of the pheromone infrastructure proceeds on two time scales, running in separate threads.

The first thread updates the book of pages each time the domain time advances past the next page boundary. At each step, The former "now+1" page is replaced with a new current page, whose pheromones correspond to the locations and strengths of observed units;
An empty page is added at the prediction horizon;
The oldest page is discarded, since it has passed the insertion horizon.

The second thread moves the ghosts from one page to the next, as fast as the processor allows. At each step, Ghosts reaching the $\tau = t$ page are evaluated for fitness and removed or evolved;
New ghosts from the avatars and from the evolutionary process are inserted at the insertion horizion;
A population of ghosts based on the fittest ghosts are inserted at $\tau = t$ to run into the future;
Ghosts that have moved beyond the prediction horizon are removed;
All ghosts plan their next actions based on the pheromone field in the pages they currently occupy;
The system computes the next state of each page, including executing the actions elected by the ghosts, and (in future pages) evaporating pheromones and recording new deposits from the recently arrived ghosts.

Ghost movement based on pheromone gradients is a very simple process, so this system can support realistic agent populations without excessive computer load. In our current system, each avatar generates eight ghosts per shift. Since there are about 50 entities in the battlespace (about 20 units each of Red and Blue and about 5 of Green), we must support about 400 ghosts per page, or about 24000 over the entire book.

How fast a processor do we need? Let p be the real-time duration of a page in seconds. If each page represents 60 seconds of domain time, and we are replaying a simulation at 2× domain time, p=30. Let n be the number of pages between the insertion horizon and $\tau = t$. In our current system, n=30. Then a shift rate of n/p shifts per second will permit ghosts to run from the insertion horizon to the current time at least once before a new page is generated. Empirically, we have found this level a reasonable lower bound for reasonable performance, and easily achievable on stock WinTel platforms.

Information Sources

The flexibility of the BEE's pheromone infrastructure permits the integration of numerous information sources as input to our characterizations of entity personalities and predictions of their future behavior. Our current system draws on three sources of information, but others can readily be added.

Real-world observations.—Observations from the real world are encoded into the pheromone field each increment of BEE time, as a new "current page" is generated. Table 1 identifies the entities that generate each flavor of pheromone.

Statistical estimates of threat regions.—An independent process[1] uses statistical techniques to estimate the level of threat to each force (Red or Blue), based on the topology of the battlefield and the known disposition of forces. For example, a broad open area with no cover is particularly threatening, especially if the opposite force occupies its margins. The results of this process are posted to the pheromone pages as "RedThreat" pheromone (representing a threat to red) and "BlueThreat" pheromone (representing a threat to Blue).

[1] This process, known as SAD (Statistical Anomaly Detection), is developed by our colleagues Rafael Alonso, Hua Li, and John Asmuth at Sarnoff Corporation.

AI-based plan recognition.—BEE is motivated by the recognition that prediction requires not only analysis of an entity's intentions, but also its internal emotional state and the dynamics it experiences externally in interacting with the environment. While plan recognition is not sufficient for effective prediction, it is a valuable input. In our current system, a Bayes net is dynamically configured based on heuristics to identify the likely goals that each entity may hold.[2] The destinations of these goals function as "virtual pheromones." As described in Section 3.1, ghosts include their distance to such points in their action decisions, achieving the result of gradient following without the computational expense of maintaining a pheromone field.

[2] This process, known as KIP (Knowledge-based Intention Projection), is developed by our colleagues Paul Nielsen, Jacob Crossman, and Rich Frederiksen at Soar Technology.

Experimental Results

We have tested BEE in a series of experiments in which human wargamers make decisions that are played out in a real-time battlefield simulator. The commander for each side (Red and Blue) has at his disposal a team of pucksters, human operators who set waypoints for individual units in the simulator. Each puckster is responsible for four to six units. The simulator moves the units, determines firing actions, and resolves the outcome of conflicts.

Fitting Dispositions

To test our ability to fit personalities based on behavior, one Red puckster responsible for four units was designated the "emotional" puckster. His instructions were to select two of his units to be cowardly ("chickens") and two to be irritable ("Rambos"). He did not disclose this assignment during the run. His instructions were to move each unit according to the commander's orders until the unit encountered circumstances that would trigger the emotion associated with the unit's disposition. Then he would manipulate chickens as though they were fearful (typically avoiding combat and moving away from Blue), and would move Rambos into combat as quickly as possible.

We found that the difference between the two disposition values (Cowardice–Irritability) of the fittest ghosts is a better indicator of the emotional state of the corresponding entity than either value by itself.

Figure 4:
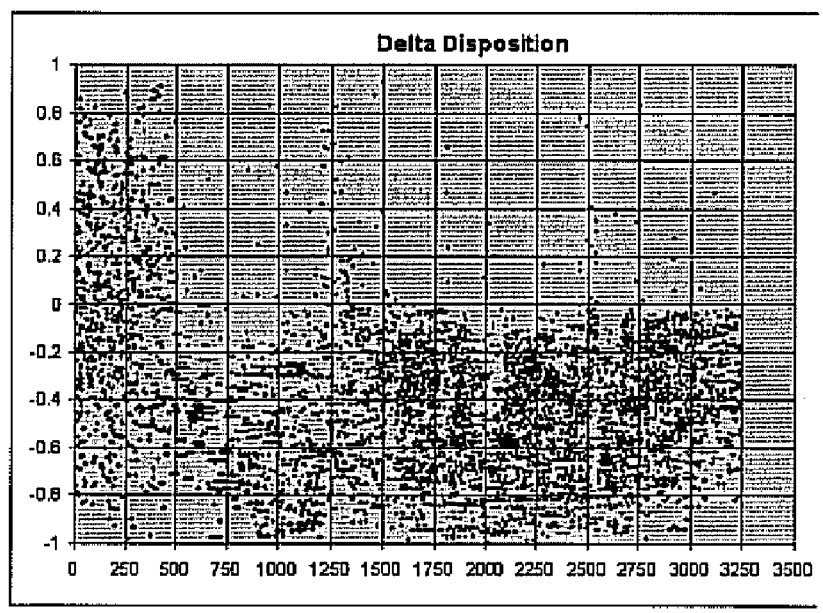
FIG. 4 is a Delta Disposition for a Chicken's Ghosts.

FIG. 4 shows the delta disposition for each of the eight fittest ghosts at each time step, plotted against the time step in seconds, for a unit played as a Chicken in an actual run. The values clearly trend negative.

Figure 5:
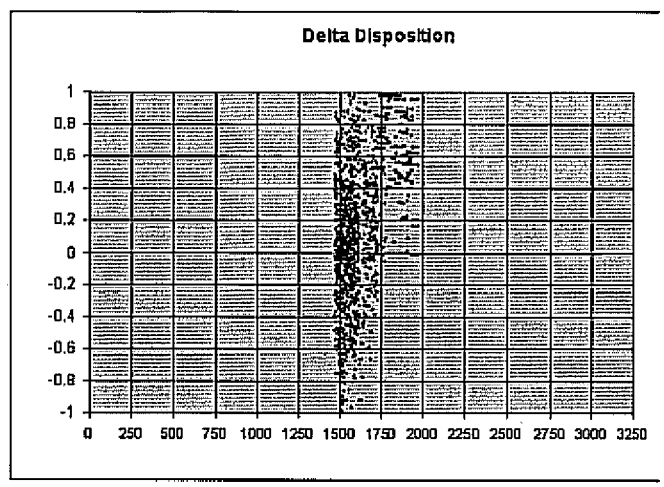
FIG. 5 is a Delta Disposition for a Rambo.
Figure 6:
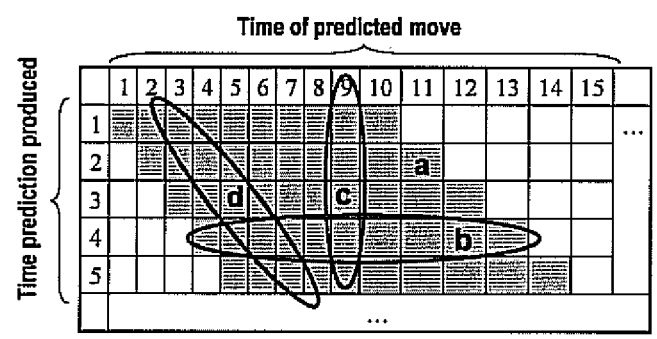
FIG. 6 shows Evaluating predictions. Each row corresponds to a successive prediction for a given unit, and each column to a time in the real world that is covered by some set of these predictions. The shaded cells show which predictions cover which time periods. Each cell (a) contains the location error, that is, how far the unit is at the time indicated by the column from where the prediction indicated by the row said it would be. We can average these errors across a single prediction (b) to estimate the prospective accuracy of a single prediction, across a single time (c) to estimate the retrospective accuracy of all previous predictions referring to a given time, or across a given offset from the start of the prediction (d) to estimate the horizon error, how prediction accuracy varies with look-ahead depth.

FIG. 5 is a shows a similar plot for a Rambo. Units played with an aggressive personality tend to die very soon, and often do not give their ghosts enough time to evolve a clear picture of their personality, but in this case the positive Delta Disposition is clearly evident before the unit's demise.

To distill such a series of points into a characterization of a unit's personality, we maintain a 800-second exponentially weighted moving average of the Delta Disposition, and declare the unit to be a Chicken or Rambo if this value passes a negative or positive threshold, respectively. Currently, this threshold is set at 0.25. In addition to passing this threshold, we are exploring additional filters. For example, a rapid rate of increase enhances the likelihood of calling a Rambo; units that seek to avoid detection and avoid combat are more readily called Chicken.

Table 4 shows the percentages of emotional units detected in a recent series of experiments. We never called a Rambo a Chicken, and examination of the logs for the one case where we called a Chicken a Rambo shows that in fact the unit was being played aggressively, rushing toward oncoming Blue forces. Because the brave die young, we almost never detect units played intentionally as Rambos.

TABLE 4

EXPERIMENTAL RESULTS ON FITTING DISPOSITIONS
(16 runs)

|  | Called Correctly | Called Incorrectly | Not Called |
|---|---|---|---|
| Chickens | 68% | 5% | 27% |
| Rambos | 5% | 0% | 95% |

In addition to these results on units intentionally played as emotional, we have a number of cases where other units were detected as cowardly or brave. Analysis of the behavior of these units shows that these characterizations were appropriate: units that flee in the face of enemy forces or weapons fire are detected as Chickens, while those that stand their ground or rush the adversary are denominated as Rambos.

Integrated Predictions

Each ghost that runs into the future generates a possible future path that its unit might follow. The set of such paths for all ghosts embodies a number of distinct predictions, including the most or least likely future, the future that poses the greatest or least risk to the opposite side, the future that poses the greatest or least risk to one's own side, and so forth. In the experiments reported here, we select the future whose ghost receives the most guidance from pheromones in the environment at each step along the way. In this sense, it is the most likely future.

Assessing the accuracy of these predictions requires a set of metrics, and a baseline against which they can be compared.

Metrics for Predictions

We have explored two sets of metrics. One set evaluates predictions in terms of their individual steps. The other examines several characteristics of an entire prediction.

The step-wise evaluations are based on the structure summarized schematically in Figure. Each row in the matrix is a successive prediction. Each column describes a real-world time step. A given cell records the distance between where the row's prediction indicated the unit would be at the column's time, and where it actually was.

The figure shows how these cells can be averaged meaningfully to yield three different measures: the prospective accuracy of a single prediction issued at a point in time, the retrospective accuracy of all predictions concerning a given point in time, or the offset accuracy showing how predictions vary as a function of look-ahead depth.

Figure 7:
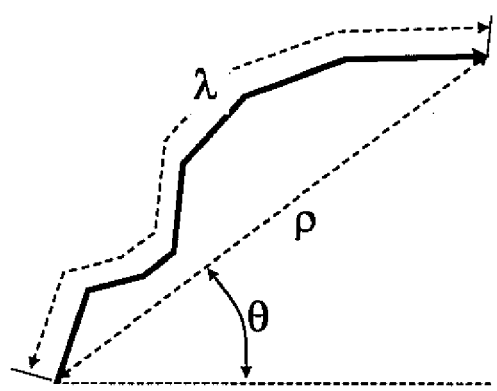
FIG. 7 shows path Characteristics.—Angle θ, straight-line radius ρ, and actual length λ.

The second set of metrics is based on characteristics of an entire prediction. FIG. 7 summarizes three such characteristics of a path (whether real or predicted): the overall angle $\theta$ it subtends, the straight-line radius $\rho$ from start to end, and the actual length $\lambda$ integrated along the path. A fourth characteristic of interest is the number of time intervals $\tau$ during which the unit was moving. Each of these four values provides a basis of comparison between a prediction and a unit's actual movement (or between any two paths).

AScore (Angle Score).—Let $\theta_p$ be the angle associated with the prediction, and $\theta_a$ the angle associated with the unit's actual path over the period covered by the prediction. Let $\Delta\theta=|\theta_p-\theta_a|$. The angle score is (with angles expressed in degrees)

$$AScore=1-Min(\Delta\theta, 360-\Delta\theta)/180$$

If $\Delta\theta=0$, AScore=1. If $\Delta\theta=180$, AScore=0. The average of a set of random predictions will produce a score approaching 0.5.

RScore (Range Score).—Let $\rho_p$ be the straight-line distance from the current position to the end of the prediction, and $\rho_a$ the straight-line distance for the actual path. The range score is:

$$RScore=1.0-|\rho_p-\rho_a|/Max(\rho_p,\rho_a)$$

If the prediction is perfect, $\rho_p=\rho_a$, and RScore=1. If the ranges are different, RScore gives the percentage that the shorter range is of the longer one. Special logic returns an RScore of 0 if just one of the ranges is 0, and 1 if both are 0.

LScore (Length Score).—Let $\lambda_p$ be the sum of path segment distances for the prediction, and $\lambda_a$ the sum of path segment distances for the actual path. The length score is:

$$LScore=1.0-|\lambda_p-\lambda_a|/Max(\lambda_p,\lambda_a)$$

If the prediction is perfect, $\lambda_p=\lambda_a$, and LScore=1. If both lengths are non-zero, LScore indicates what percentage the shorter path length is of the longer path length. Special logic returns an LScore of 0 if just one of the lengths is 0, and 1 if both are 0.

TScore (Time Score).—Let $\tau_p$ be the number of minutes that the unit is predicted to move, and $\tau_a$ the number of minutes that it actually moves. The time score is:

$$TScore=1.0-|\tau_p-\tau_a|/Max(\tau_p,\tau_a)$$

If the prediction is perfect, $\tau_p=\tau_a$, and LScore=1. If both times are non-zero, TScore indicates what percentage the shorter path length is of the longer path length. Special logic returns a TScore of 0 if just one of the times is 0, and 1 if both are 0.

Baseline

As a baseline for comparison, we have also implemented a random-walk predictor. This process starts at a unit's current location, then takes 30 random steps. A random step consists of picking a random number uniformly distributed between 0 and 120 indicating the next cell to move to in an 11-by-11 grid with the current position at the center. (The grid was size 11 because the BEE movement model allows the ghosts to move from 0 to 5 cells in the x and y directions at each step.) The random number r is translated into x and y steps $\Delta x$, $\Delta y$ using the equations $\Delta x=r/11-5$, $\Delta y=(r \mod 11)-5$.

To compile a baseline, the random prediction is generated 100 times, and each of these runs is used to generate one of the metrics discussed above. The baseline that we report is the average of these 100-instances.

EXAMPLES

Figure 8:
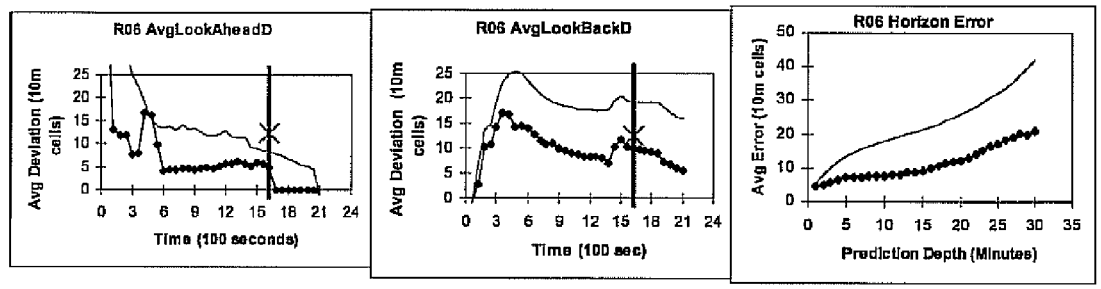
FIG. 8 shows stepwise metrics, including, from left to right, average prospective, retrospective, and horizon error. The thin line is the average of metrics from 100 random walks. The vertical line indicates when the unit dies. Since these are error curves, lower is better.

FIG. 8 illustrates the three stepwise metrics for a single unit in a single run. In the case of this unit, BEE was able to formulate good predictions, which are superior to the baseline in all three metrics. It is particularly encouraging that the horizon error increases so gradually. In a complex nonlinear system, trajectories may diverge at some point, making prediction physically impossible. We would expect to see a discontinuity in the horizon error if we were reaching this limit. The gentle increase of the horizon error suggests that we are not near this position.

Figure 9:
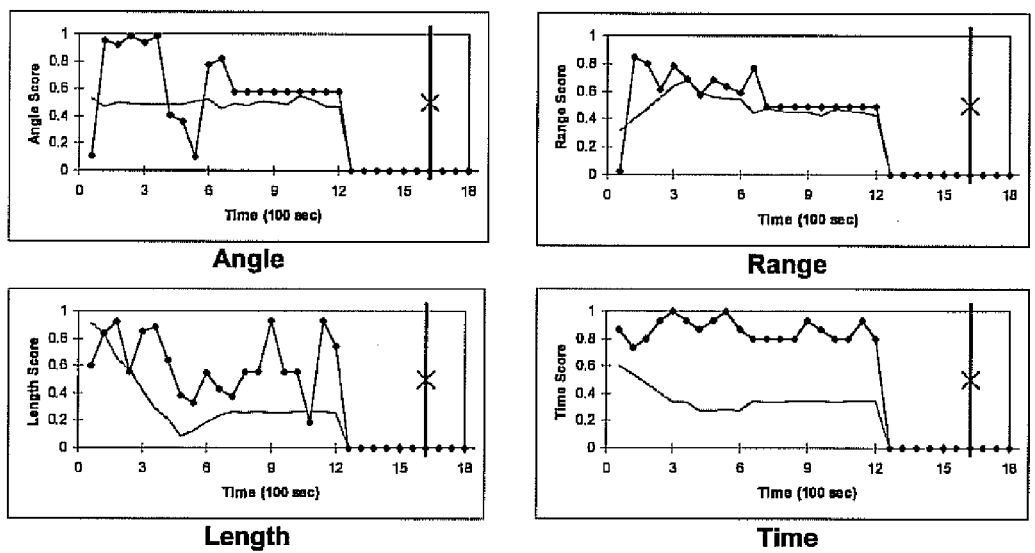
FIG. 9 shows component metrics. The thin line is the random baseline. Since these metrics indicate degree of agreement between prediction and baseline, higher is better.

FIG. 9 illustrates the four component metrics for the same unit and the same run. In general, these metrics support the conclusion that our predictions are superior to the baseline, and make clear which characteristics of the prediction are most reliable.

The BEE architecture lends itself to extension in several promising directions:

The various inputs being integrated by the BEE are only an example of the kinds of information that can be handled. The basic principle of using a dynamical simulation to integrate a wide range of influences can be extended to other inputs as well, requiring much less additional engineering than other more traditional ways of reasoning about how different knowledge sources come together in impacting an agent's behavior.

Our initial limited repertoire of emotions is a small subset of those that have been distinguished by psychologists, and that might be useful for understanding and projecting behavior. We expect to extend the set of emotions and supporting dispositions that BEE can detect.

The mapping between an agent's psychological (cognitive and emotional) state and its outward behavior is not one-to-one. Several different internal states might be consistent with a given observed behavior under one set of environmental conditions, but might yield distinct behaviors under other conditions. If the environment in the recent past is one that confounds such distinct internal states, we will be unable to distinguish them, and if the environment shifts to a condition in which they yield different behaviors, our predictions will suffer. We might be able to probe the real world, perturbing it in ways that would stimulate distinct behaviors from entities whose psychological state is otherwise indistinguishable. We will explore how BEE's faster-than-real-time simulation may enable us to identify appropriate probing actions, greatly increasing the effectiveness of intelligence efforts.

BEE has been developed in the context of adversarial reasoning in urban warfare. We expect that it will be applicable in a much wider range of applications, including computer games, business strategy, and sensor fusion, and are exploring such alternative applications for it.

REFERENCES

[1] S. Brueckner. *Return from the Ant: Synthetic Ecosystem for Manufacturing Control*. Dr.rer.nat. Thesis at Humboldt University Berlin, Department of Computer Science, 2000. Available at http://dochost.rz.hu-berlin.de/dissertationen/brueckner-sven-2000-06-21/PDF/Brueckner.pdf.

[2] S. Carberry. Techniques for Plan Recognition. *User Modeling and User-Adapted Interaction*, 11(1-2):31-48, 2001. Available at http://www.cis.udel.edu/~carberry/Papers/UMUAI-PlanRec.ps.

[3] J. Ferber and J.-P. Müller. Influences and Reactions: a Model of Situated Multiagent Systems. In *Proceedings of Second International Conference on Multi-Agent Systems (ICMAS-96)*, pages 72-79, 1996.

[4] A. Haddadi and K. Sundermeyer. Belief-Desire-Intention Agent Architectures, In G. M. P. O'Hare and N. R. Jennings, Editors, *Foundation of Distributed Artificial Intelligence*, pages 169-185. John Wiley, New York, N.Y., 1996.

[5] A. Ilachinski. *Artificial War: Multiagent-based Simulation of Combat*. Singapore, World Scientific, 2004.

[6] H. Kantz and T. Schreiber. *Nonlinear Time Series Analysis*. Cambridge, UK, Cambridge University Press, 1997.

[7] M. K. Lauren and R. T. Stephen. Map-Aware Non-uniform Automata (MANA)—A New Zealand Approach to Scenario Modelling. *Journal of Battlefield Technology*, 5(1 (March)):27ff, 2002. Available at http://www.argospress.com/jbt/Volume5/5-1-4.htm.

[8] F. Michel. *Formalisme, méthodologie et outils pour la modélisation et la simulation de systèmes multi-agents*. Doctorat Thesis at Université des Sciences et Techniques du Languedoc, Department of Informatique, 2004. Available at http://www.lirmm.fr/~fmichel/these/index.html.

[9] A. Ortony, G. L. Clore, and A. Collins. *The cognitive structure of emotions*. Cambridge, UK, Cambridge University Press, 1988.

[10] H. V. D. Parunak, R. Bisson, S. Brueckner, R. Matthews, and J. Sauter. Representing Dispositions and Emotions in Simulated Combat. In *Proceedings of Workshop on Defence Applications of Multi-Agent Systems (DAMAS05, at AAMAS05)*, pages (forthcoming), 2005. Available at http://www.altarum.net/~vparunak/DAMAS05DETT.pdf.

[11] H. V. D. Parunak and S. Brueckner. Ant-Like Missionaries and Cannibals: Synthetic Pheromones for Distributed Motion Control. In *Proceedings of Fourth International Conference on Autonomous Agents (Agents 2000)*, pages 467-474, 2000. Available at http://www.altarum.net/~vparunak/MissCann.pdf.

[12] H. V. D. Parunak, S. Brueckner, M. Fleischer, and J. Odell. A Design Taxonomy of Multi-Agent Interactions. In *Proceedings of Agent-Oriented Software Engineering IV*, pages 123-137, Springer, 2003. Available at www.altarum.net/~vparunak/cox.pdf.

[13] H. V. D. Parunak, S. Brueckner, and J. Sauter. Digital Pheromones for Coordination of Unmanned Vehicles. In *Proceedings of Workshop on Environments for Multi-Agent Systems (E4MAS 2004)*, pages 246-263, Springer, 2004. Available at http://www.altarum.net/~vparunak/AAMAS04_UAVCoordination.pdf.

[14] H. V. D. Parunak, S. A. Brueckner, and J. Sauter. Digital Pheromone Mechanisms for Coordination of Unmanned Vehicles. In *Proceedings of First International Conference on Autonomous Agents and Multi-Agent Systems (AAMAS 2002)*, pages 449-450, 2002. Available at www.altarum.net/~vparunak/AAMAS02ADAPTIV.pdf.

[15] A. S. Rao and M. P. Georgeff. Modeling Rational Agents within a BDI Architecture. In *Proceedings of International Conference on Principles of Knowledge Representation and Reasoning (KR-91)*, pages 473-484, Morgan Kaufman, 1991.

[16] J. A. Sauter, R. Matthews, H. V. D. Parunak, and S. Brueckner. Evolving Adaptive Pheromone Path Planning Mechanisms. In *Proceedings of Autonomous Agents and*

*Multi-Agent Systems (AAMAS02)*, pages 434-440, 2002. Available at www.altarum.net/~vparunak/AAMAS02Evolution.pdf.

Having described our invention, we claim:

1. A computer-implemented method of predicting the behavior of an agent in an environment, comprising the steps of:
   modeling a plurality of software agents representing entities to be analyzed;
   providing a set of parameters governing the behavior of the agents;
   executing a computer simulation of an environment including the agents;
   estimating the internal state of at least one of the agents based upon its behavior in the simulation, including its movement within the environment; and
   predicting the likely future behavior of the agent based upon the estimate of its internal state agents.

2. The method of claim 1, wherein the agent's internal state is estimated by examining the evolution of the agent's observed behavior.

3. The method of claim 1, wherein the agent's internal state is estimated in conjunction with an agent-based model of the environment.

4. The method of claim 1, wherein the prediction of the agent's future behavior takes into account the dynamics of the agent's interaction with the environment.

5. The method of claim 1, wherein the entities to be analyzed include human beings.

6. The method of claim 1, wherein the simulated environment is based upon a digital pheromone infrastructure.

7. The method of claim 6, wherein the digital pheromones are scalar variables that agents can sense and which they deposit at their current location in the environment.

8. The method of claim 7, wherein the agents respond to the local concentrations of the digital pheromones tropistically through climbing or descending local gradients.

9. The method of claim 6, wherein the pheromone infrastructure runs on the nodes of a graph-structured environment.

10. The method of claim 6, wherein the graph-structured environment is a rectangular lattice.

11. The method of claim 6, wherein each agent is capable of aggregating pheromone deposits from individual agents, thereby fusing information across multiple agents over time.

12. The method of claim 6, wherein each agent is capable of evaporating pheromones over time to remove inconsistencies that result from changes in the simulation.

13. The method of claim 6, wherein each agent is capable of diffusing pheromones to nearby places, thereby disseminating information for access by nearby agents.

14. The method of claim 6, wherein the movements of the agents change their deposit patterns.

15. The method of claim 6, wherein the simulation integrates knowledge of threat regions, a cognitive analysis of the agent's beliefs, desires, and intentions, a model of the agent's emotional disposition and state, and the dynamics of interactions with the environment.

16. The method of claim 1, wherein the simulation involves urban warfare.

17. The method of claim 1, wherein the simulation involves a computer game.

18. The method of claim 1, wherein the simulation involves a business strategy.

19. The method of claim 1, wherein the simulation involves a sensor fusion.

* * * * *